United States Patent [19]
Gouge

[11] Patent Number: 5,859,363
[45] Date of Patent: Jan. 12, 1999

[54] DEVICE AND METHOD FOR SMOKE TESTING OF GAS FURNACE HEAT EXCHANGERS

[76] Inventor: Larry Michael Gouge, Rte. 1, Box 133, Timpson, Tex. 75975

[21] Appl. No.: 886,659

[22] Filed: Jul. 1, 1997

[51] Int. Cl.$^6$ .............................. G01M 3/20; B01F 3/02; B01J 7/00

[52] U.S. Cl. ...................... 73/40.7; 73/40.5 R; 116/214; 165/11.1; 222/3

[58] Field of Search ............................. 73/40.7, 40.5 R; 165/11.1; 222/3; 116/214

[56] References Cited

U.S. PATENT DOCUMENTS

| | | | |
|---|---|---|---|
| 2,930,511 | 3/1960 | Vanerstrom | 222/3 |
| 3,087,327 | 4/1963 | Kägi | 73/40.7 |
| 3,483,735 | 12/1969 | Packo | 73/40.7 |
| 3,975,943 | 8/1976 | Brachet | 73/40 |
| 4,155,249 | 5/1979 | Scott | 73/40.7 |
| 4,198,856 | 4/1980 | Kaselaan et al. | 73/40.7 |
| 4,330,428 | 5/1982 | Clifford | 252/359 CG |
| 4,524,607 | 6/1985 | Pelletier et al. | 73/40.5 R |
| 4,646,558 | 3/1987 | Gualtier et al. | 73/40.7 |
| 4,694,695 | 9/1987 | Sewell et al. | 73/40.5 R |
| 4,942,920 | 7/1990 | Chalifoux et al. | 165/1 |
| 5,107,698 | 4/1992 | Gilliam | 73/40.7 |
| 5,182,941 | 2/1993 | Frenkel et al. | 73/40 |
| 5,335,536 | 8/1994 | Runnevik | 73/40.7 |

OTHER PUBLICATIONS

Combustion Testing Module, Lennox Education, Module 1204, Sep., 1995.
Heat Exchanger Inspection Module, Lennox Education, Module 1207, Nov. 1994.
Emi–Tech, Inc., Vacutec Test Information.
Smog Check, Motor Apr., 1996, Sue Hannibal.
Motor Magazine, Sep., 1995, Reversing Air Sander by Mac Tools, p. 28.
Roadmaster Engine Corporation, Uses and Recommends, Vacutec.
Emi–Tech, Inc. Operations Manual, Vacutec, The Emission Technician.
Emi–Tech, Inc., Operation Manual, Vacutec, Model 816, The Diesel Technician.

*Primary Examiner*—Hezron Williams
*Assistant Examiner*—J. David Wiggins
*Attorney, Agent, or Firm*—Frohwitter

[57] ABSTRACT

A smoke generator for smoke testing heat exchangers of gas furnaces for the presence or absence of leakage or fluid-tight integrity, the generator having: a smoke chamber housing having upper and lower portions; at least one heating element in the upper portion of the smoke chamber housing; a pump which supplies a gas to the smoke chamber housing; a liquid which fills the lower portion of the smoke chamber housing, wherein the at least one heating element is suspended above the liquid; an applicator of liquid to the at least one heating element; and a smoke vent in the upper portion of the smoke chamber housing. A method of smoke testing a heat exchanger of a gas furnace for the presence or absence of leakage or fluid-tight integrity, the method having the following steps: closing an intake and an outtake of the heat exchanger; fluidly communicating a smoke generator with the heat exchanger, wherein the smoke generator comprises: a smoke chamber housing having upper and lower portions, at least one heating element in the upper portion of the smoke chamber housing, a pump which supplies a gas to the smoke chamber housing, a liquid which fills the lower portion of the smoke chamber housing, wherein the at least one heating element is suspended above the liquid, an applicator of liquid to the at least one heating element, and a smoke vent in the upper portion of the smoke chamber housing; filling the heat exchanger with smoke from the smoke generator; and observing smoke exiting the heat exchanger.

19 Claims, 15 Drawing Sheets

DEVICE AND METHOD FOR SMOKE TESTING OF GAS FURNACE HEAT EXCHANGERS

BACKGROUND OF THE INVENTION

The present invention relates generally to gas furnaces for residential and commercial heating systems. Specifically, the invention relates to leak detection apparatuses and methods for inspecting heat exchangers of natural gas furnaces.

Gas furnaces comprise two circulating air systems: (1) the living space air circulating system which passes living space air over the exterior of the heat exchanger, and (2) the gas exhaust circulating system which passes hot combustion products through the interior of the heat exchanger. To ensure no harmful products of gas combustion escape from the interior of the heat exchanger into the living space air circulating system which passes over the exterior of the heat exchanger, it is important to determine whether holes or cracks have developed in the heat exchanger.

As shown in FIGS. 1A and 1B, the living space air circulating system 1 is described relative to a typical gas furnace 3. Air is circulated from the living space of the residential or commercial structure through the intake port 4. A turbine, not shown, pulls air into the intake port 4 and pushes it toward the heat exchanging section 5 of the living space air circulating system 1. During operation, the interior of the heat exchanger 7 is warmer than the air pulled from the living space. Thus, as the living space air passes over the exterior of the heat exchanger 7, heat is transferred from the heat exchanger 7 to the living space air. Finally, the warmed living space air passes from the heat exchanging section 5 through the plenum 6 for distribution back into the living space of the structure.

As shown in FIGS. 2A and 2B, a combustion products venting system 2 is shown relative to a gas furnace 3. Gas is supplied to a burner 8 through a gas line 9. The manifold pressure of the gas is regulated by a regulator 10. Air which is necessary for combustion is allowed to enter the heat exchanger 7 through an air intake 11. The burner 8 is inserted into a lower portion of the heat exchanger 7. As air within the heat exchanger is heated by the burner 8, the air begins to rise within the heat exchanger until it reaches the air outtake 12. This air, of course, comprises living space air drawn through the intake 11 and products of the combustion of the gas. In the furnace shown in the figure, three separate heat exchangers 7 are shown. The air exiting the air outtakes 12 from the heat exchangers 7 is collected by a collector 13 for venting through the flue 14.

Typically, the natural gas combusted in gas furnaces produces non-toxic combustion products including carbon dioxide, water vapor and nitrogen. However, in instances where the combustion of the natural gas is not complete, harmful products including carbon monoxide, aldahydes and soot are circulated through the interior of the heat exchanger. Thus, if cracks or holes develop in the heat exchanger, these harmful products of combustion may leak from the interior of the heat exchanger into the living space air circulating system 1 so that the harmful products are circulated to the living space of the structure. Thus, it is critically important to detect and locate cracks or holes in heat exchanger as they develop.

Typical heat exchangers are constructed of metals because of their durability and thermal conductivity characteristics. Cracks and holes, however, develop in heat exchangers because of stresses induced by thermal expansion. Corrosive materials which come in contact with the interior and exterior of heat exchangers also weaken the structural integrity of the heat exchanger. Finally, if the furnace experiences improper venting and inadequate supply of combustion air, dirty filters, an improper firing range which produces condensation, or flame impingement, cracks or holes are likely to develop in the heat exchanger. Therefore, regardless of the material from which the heat exchanger is manufactured, the development of cracks and holes in the heat exchanger during its lifetime of service is a real possibility.

Different furnaces are designed to produce different operation pressure levels within the heat exchangers relative to the living space air circulating system. These system fall into two basic categories: naturally draw systems and induced flow systems.

Naturally drawn systems use allow hot air, which rises through a cooler air mass, to draw the products of combustion at the burner through the heat exchanger and out through the flue. This is the same principle by which fireplace chimneys work. As the hot air rises in the flue, a slightly negative pressure is induced within the heat exchanger relative to the air in the heat exchanging section of the living space air circulating system. Thus, even if the holes or cracks exist in the heat exchanger, air will pass into the heat exchanger, rather than out of the heat exchanger, because of the relative low pressure within. The relative negative pressure in naturally drawn systems, however, is small and may be reversed depending on the operating condition of the furnace. For example, when the turban of the living space air circulating system is turned off and does not push air through the heat exchanging section 5, the pressure on the exterior of the heat exchanger 7 may fall below the pressure within the heat exchanger 7. This condition allows air to pass from within the heat exchanger into the living space air circulation system 1. Because harmful combustion products are typically generated during startup, when the turban of the living space air circulating system does not operate, holes and cracks in the heat exchanger must be identified.

Induced flow systems always have greater relative pressure within the heat exchanger. These systems do not have a burner inserted into the heat exchanger. Rather, the burner is located immediately outside the air intake and the flames are blown under pressure into the heat exchanger. Thus, regardless whether the turban of the living space air circulating system is operating, the pressure within the heat exchanger is always greater than the pressure without. It is particularly important to determine the location and size of cracks and holes in the heat exchangers of these systems.

Depending on the furnace system, smaller holes and cracks only allow insignificant amounts of air, well below acceptable safe limits, to pass from the heat exchanger. In fact, many heat exchangers are manufactured with pin point holes and cracks. These are predominantly found at seems between metal component parts. These heat exchangers are typically only used with naturally drawn furnace systems. In these systems, a heat exchanger need not be replaced unless additional holes and cracks develop. Thus, an optimum heat exchanger testing method is one which tests the exchanger under relative pressures similar to its operating pressures. This allows the technician to determine whether the heat exchanger has developed holes and cracks in excess of an acceptable limit for the particular furnace system.

Several heat exchanger testing methods have been use to detect cracks and holes. These include: visual examination, sulfur candles and other odorants, smoke bombs and smoke candles, CFC or HCFC refrigerants, salt sodium sprays, carbon monoxide, titanium tetrachloride, and fluorescent sprays.

The visual examination method simply entails using a mirror and a strong flashlight to inspect the exterior of the heat exchanger. Of course, this method is limited because not all exterior surfaces of the heat exchanger are accessible without removing the heat exchanger from the furnace. Further, it is difficult to determine exactly how much air escapes from the heat exchanger during operation.

Sulfur candles or other odorants are used by introducing the strong odor into the air intake of the heat exchanger. The technician then smells the air in the vicinities of the intake port and plenum of the living space air circulating system 1 to detect a leak. Notwithstanding the harmful effects of the chemical odorants on the heat exchanger, the method is highly unreliable because the location and size of the holes and cracks are not identifiable.

Smoke bombs and smoke candles are inserted into the heat exchanger to detect holes and cracks. The technician closes both the air intake and outtake of the heat exchanger and then ignites the smoke bomb or candle in the interior of the heat exchanger. Holes and cracks are detected by observing smoke escaping from the heat exchanger. This test, however, produces pressures within the heat exchanger significantly dissimilar from pressures observed during normal observation. Thus, smoke is typically forced from the heat exchanger through various small cracks, seams, and even gaskets which do not leak during normal operation. Nearly all heat exchangers are manufactured with very small holes at the seams or gaskets. These are so small that they do not impose a risk leakage under normal conditions. The technician may observe smoke exiting the heat exchanger and recommend replacement of the heat exchanger even where no holes or cracks in the heat exchanger are present.

CFC or HCFC refrigerants are used to detect holes and cracks by placing the refrigerant inside the heat exchanger. A halogen leak detector is then used by the technician to determine if the refrigerant has escaped into the living space air circulating system. Refrigerants, however, produce deadly poisonous gases if combusted. Refrigerants are typically heavier than air and therefore settle in the bottom of the heat exchanger where they reside until they are removed through normal operation of the furnace, i.e., combustion. Thus, the chance of harmful gases being produced is significant. Further, the refrigerant gas method does not allow the technician to determine the location and size of holes and cracks.

Salt sodium sprays are sprayed into the burner flames while the furnace is operated. A propane torch is used by the technician to check the living space air circulating around the exterior of the heat exchanger. Sodium ions are detected when the blue flame of the propane torch turns yellow. While this test may detect very small cracks and leaks, it is impractical because even dust in the air may produce the yellow flame. Thus, dust may be mistaken for the sodium ion. Further, not all exterior surfaces of the heat exchanger are easily accessible for testing with the torch without removing the heat exchanger from the furnace.

Carbon monoxide is used to test for holes and cracks by introducing carbon monoxide into the heat exchanger. Carbon monoxide levels are then observed at the intake port and plenum of the living space air circulating system. However, carbon monoxide is not preferred because dangerous levels of carbon monoxide may inadvertently escape into the living space during the test. Further, like previous methods, the carbon monoxide method does not allow the technician to pinpoint the size and location of cracks and holes in the heat exchanger.

Finally, titanium tetrachloride is used as a fuming or smoking material. The air intake and outtake of the heat exchanger are closed and titanium tetrachloride vapor is introduced into the heat exchanger. Holes and cracks are then identified by observing exiting titanium tetrachloride vapor. Unfortunately, titanium tetrachloride is highly corrosive and considered toxic.

Therefore, there is a need for a device and method for detecting cracks and holes in gas furnace heat exchangers which allows the technician to precisely locate and evaluate cracks or holes under conditions similar to the operating conditions of the heat exchanger.

SUMMARY OF THE INVENTION

According to one aspect of the invention, a smoke generator is provided which allows for testing heat exchangers under conditions similar to the operating conditions. A smoke generating device produces a dense, non toxic smoke which is introduced into a sealed heat exchanger under a pressure similar to the operating pressure of the heat exchanger. Because the smoke is dense, the technician can easily locate and evaluate holes and cracks which are so large as to be beyond the acceptable safe limit.

According to a further aspect of the invention, there is provided a smoke generator for smoke testing heat exchangers of gas furnaces, the generator comprising: a smoke chamber housing having upper and lower portions; at least one heating element in the upper portion of the smoke chamber housing; a pump which supplies a gas to the smoke chamber housing; a liquid which fills the lower portion of the smoke chamber housing, wherein the at least one heating element is suspended above the liquid; an applicator of liquid to the at least one heating element; and a smoke vent in the upper portion of the smoke chamber housing.

According to another aspect of the invention there is provided a smoke generator for smoke testing heat exchangers of gas furnaces, the generator comprising: a smoke chamber housing having upper and lower portions; at least one heating element in the upper portion of the smoke chamber housing; a pump which supplies a gas to the smoke chamber housing; a liquid which fills the lower portion of the smoke chamber housing, wherein the at least one heating element is suspended above the liquid; an applicator of liquid to the at least one heating element; and a smoke vent in the upper portion of the smoke chamber housing; a pressure gauge for monitoring the pressure of smoke vapor within the generator; a pressure regulator of the smoke vapor within the generator; a volume flow gauge for monitoring the volume of smoke vapor escaping from the generator; and a hose for fluidly communicating with a heat exchanger of a gas furnace.

According to a still further aspect of the invention, there is provided a method of smoke testing a heat exchanger of a gas furnace, the method comprising: closing an intake and an outtake of the heat exchanger; fluidly communicating a smoke generator with the heat exchanger, wherein the smoke generator comprises: a smoke chamber housing having upper and lower portions, at least one heating element in the upper portion of the smoke chamber housing, a pump which supplies a gas to the smoke chamber housing, a liquid which fills the lower portion of the smoke chamber housing, wherein the at least one heating element is suspended above the liquid, an applicator of liquid to the at least one heating element, and a smoke vent in the upper portion of the smoke chamber housing; filling the heat exchanger with smoke from the smoke generator; and observing smoke exiting the heat exchanger.

BRIEF DESCRIPTION OF DRAWINGS

The present invention is better understood by reading the following description of non-limitative embodiments, which reference to the attached drawings wherein like parts in each of the several figures are identified by the same reference character, and which are briefly described as follows.

It is to be noted, however, that the appended drawings illustrate only typical embodiments of this invention and are therefore not to be considered limiting of its scope, as the invention may admit to other equally effective embodiments.

DETAILED DESCRIPTION OF THE INVENTION

Figure 1A:
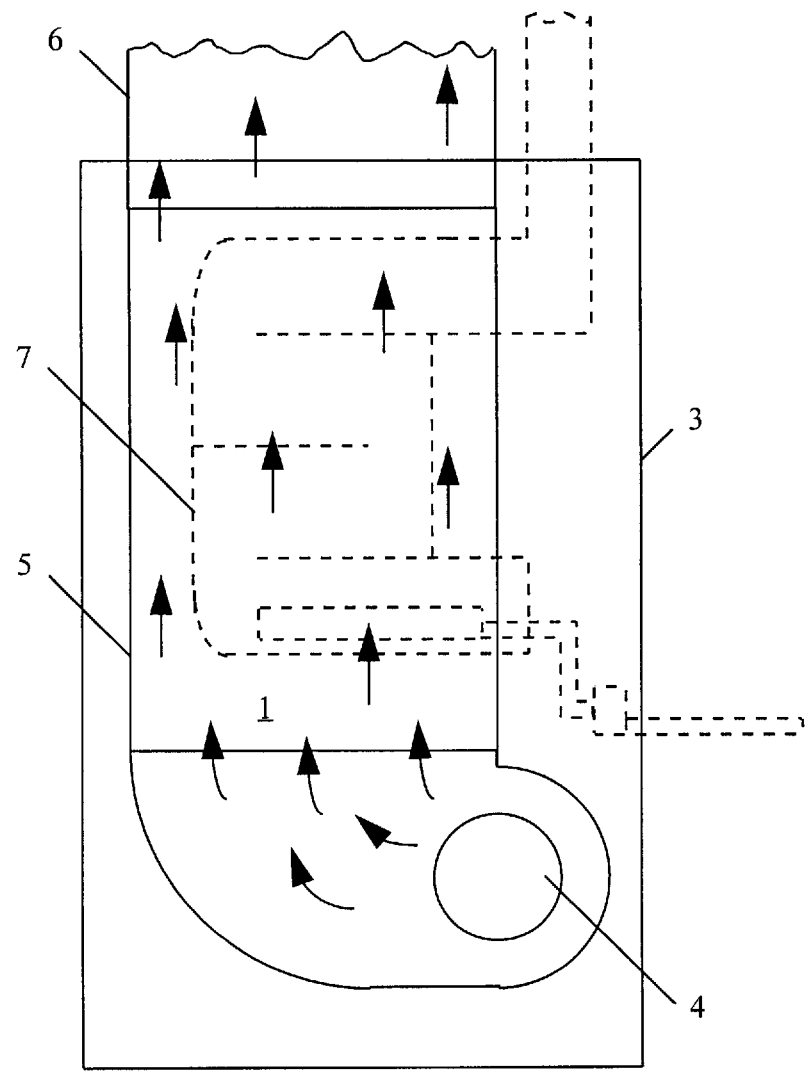
FIG. 1A is a side view of a gas furnace comprising an internal air circulating system and a combustion products venting system.
Figure 1B:
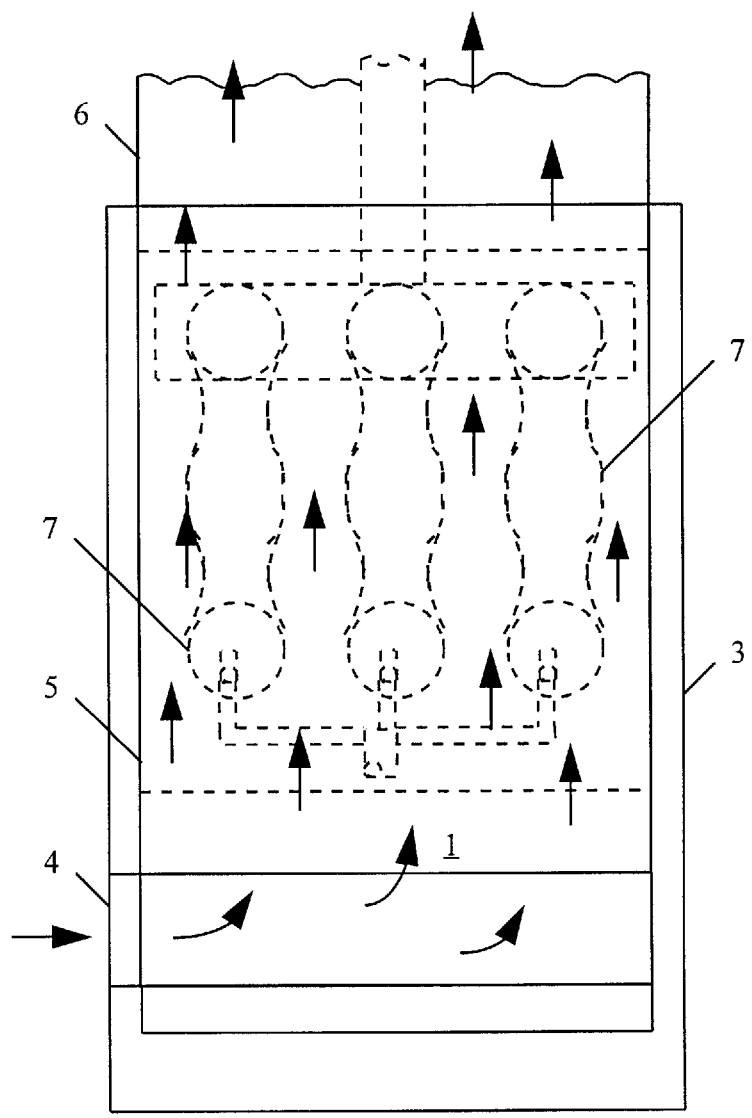
FIG. 1B is an end view of the gas furnace shown in FIG. 1A.
Figure 2A:
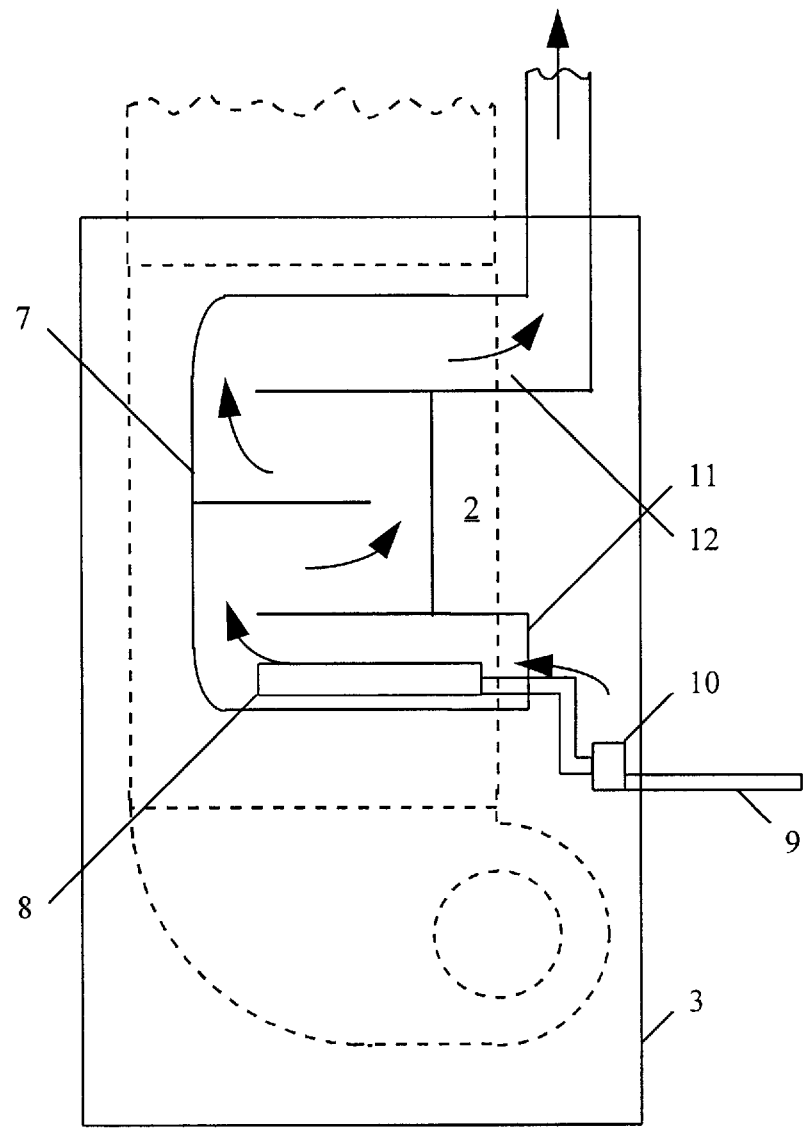
FIG. 2A is a side view of a gas furnace comprising an living space air circulating system and a combustion products venting system.
Figure 2B:
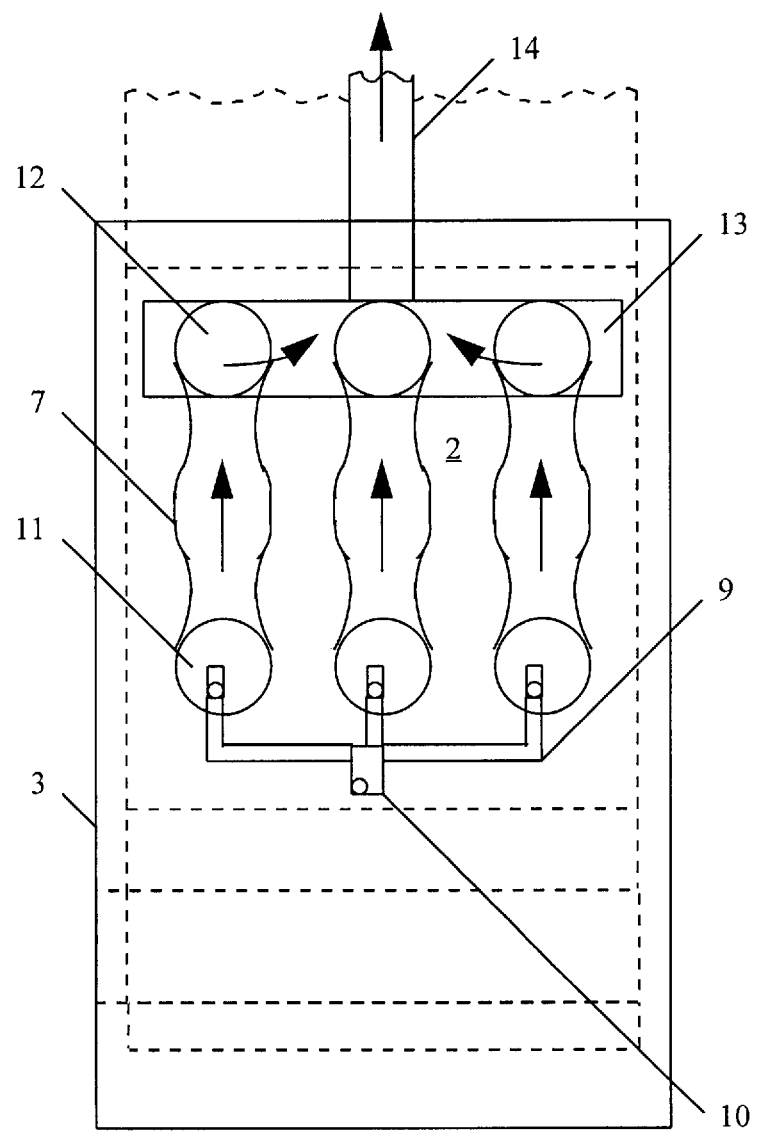
FIG. 2B is an end view of the gas furnace shown in FIG. 2A.
Figure 3:
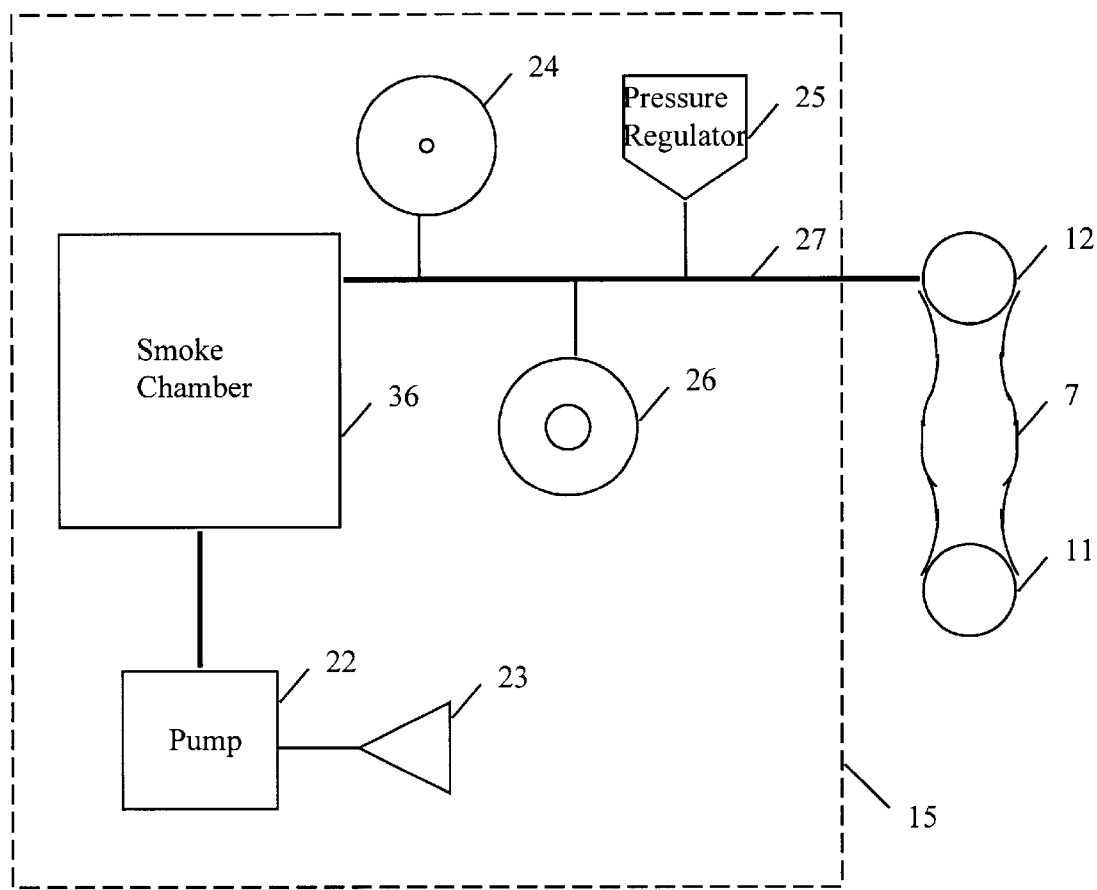
FIG. 3 is a diagram of the component parts of a smoke generator of the present invention and a heat exchanger.

As shown in FIG. 3, a schematic diagram of one embodiment of the smoke generator 15 of the present invention is shown. The smoke generator 15 comprises an air pump 22 which draws air through inlet 23 and pumps the air into a smoke chamber 36. Smoke vapor is generated within the smoke chamber 36. The smoke chamber is fluidly connected to a heat exchanger 7 by a hydraulic hose 27. The dense smoke vapor is driven by the air pump 22 and flows from the smoke chamber 36 to the heat exchanger 7 via the hydraulic hose 27. The smoke generator 15 also comprises a pressure gauge 24 which monitors the internal pressure of the system. Pressure regulator 25 is used to adjust the internal pressure of the system. In different embodiments, the pressure regulator 25 is a pressure release valve which exhausts vapor from the system or a pump control which turns the pump off when a certain pressure is obtained. Because the entire system between the air pump 22 and the heat exchanger 7 is one closed system, the pressure gauge 24 and pressure release valve 25 may be connected at any location on the system. A suitable pressure release valve is a 20 lb Overpressure Regulator Valve #CHK BRS 410-4m4f-e, distributed by Specialty Manufacturing Co., St. Paul, Minn. While any standard pressure regulator is satisfactory, the ¼" pipe inlet/outlet, 30 PSI manual regulator distributed by Hufco of Houston, Tex. is suitable. Any standard pressure gauge, such as the 2.5" dial, 0–15 lbs general purpose gauge distributed by Rawson & Co., Inc. of Houston, Tex. Finally, in this embodiment, the smoke generator 15 comprises a volume flow gauge 26 which monitors the volumetric flow rate of the dense smoke vapor to the heat exchanger 7. A suitable flowmeter is the VFB-67 Flowmeter by Dwyer Instruments, Inc, which is capable of 1–20 LPM air and has ⅛" connections. While many standard air pumps are satisfactory, #HD-275 air pump, distributed by Interdynamics and having a 47 CFH maximum air flow is suitable.

A heat exchanger 7 is tested by first determining the internal and external operating pressures of the heat exchanger during each operating cycle. This enables the technician to obtain the pressure gradient between the inside and outside of the heat exchanger during each cycle of operation. The greatest internal pressure and the lowest external pressure are used as parameters under which the smoke test is performed. Next, the technician closes the air intake 11 and outtake 12 as is known in the art. The hose 27 is attached to the heat exchanger so that the interior of the heat exchanger 7 is fluidly connected to the smoke generator 15. In one embodiment of the invention, the hose 27 is attached to one of the closure devices of the intake or outtake. Smoke vapor is then generated in the smoke chamber 36 and the pump 22 is engaged to pump air into the smoke chamber 36. As smoke begins to exit the smoke chamber 36, the closure of either the air intake 11 or air outtake 12 is released to allow air to escape the heat exchanger, which in turn allows dense smoke vapor to fill the heat exchanger under ambient pressure. As soon as smoke begins to vent from this opening, the opening is then closed. The pressure regulator 25 is adjusted to produce a pressure within the system as indicated by the pressure gauge 24. This pressure should correspond to the pressure gradient previously recorded. The technician then observes the heat exchanger 7 to detect smoke vapor escaping from holes or cracks.

The smoke generator 15 must produce a dense smoke vapor to ensure hole detection by the technician. Dense smoke is produced in the smoke chamber 36 by applying a liquid to a hot heating element. The liquid burns on the element to produce the dense smoke vapor. The temperature of the heating element, however, does not exceed the ignition temperature of the particular liquid being used. In order to prevent the liquid from overheating, the heating element is not made to directly and constantly contact the liquid reservoir within the smoke chamber. Further, dense smoke is generated by supplying sufficient oxygen for reaction with the liquid at the heating element. This is accomplished by applying small portions of liquid to the heating element in the presence of excess oxygen. As the liquid burns away, more liquid is immediately applied to the heating element and more oxygen is introduced into the smoke chamber to produce the dense smoke vapor.

Figure 4A:
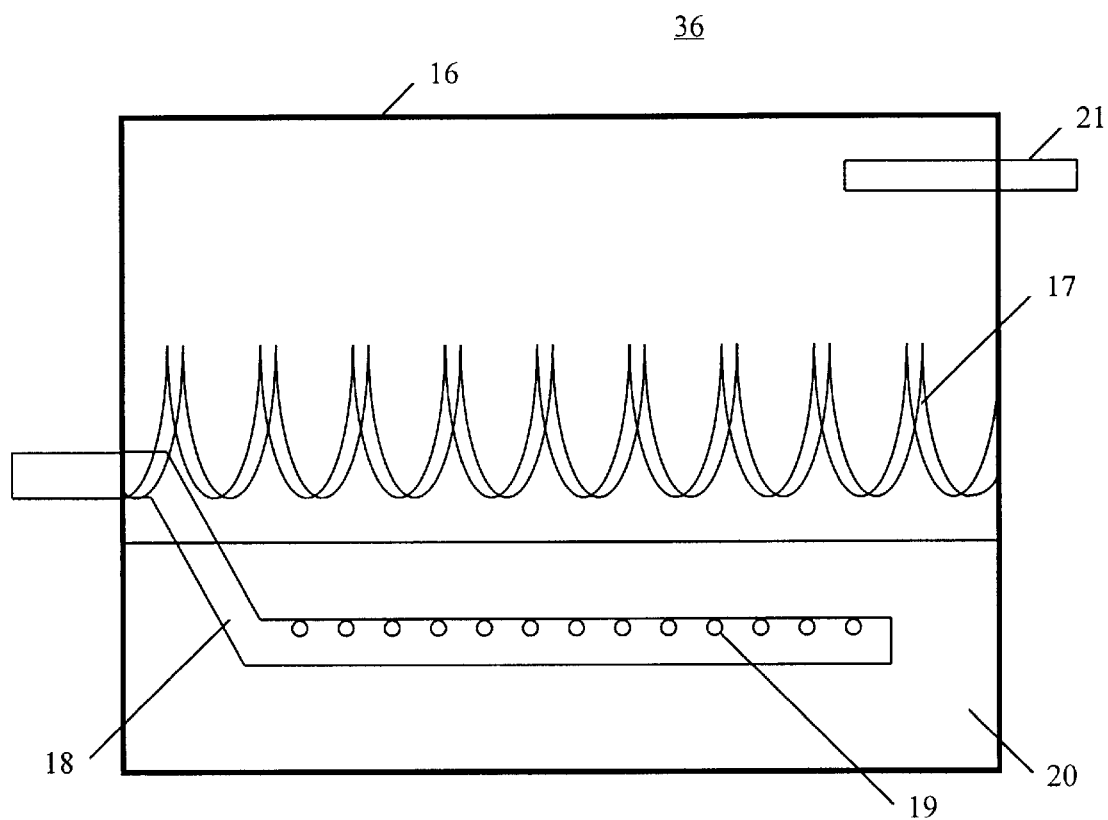
FIG. 4A is a side view of a smoke chamber of the present invention having a blower applicator.
Figure 4B:
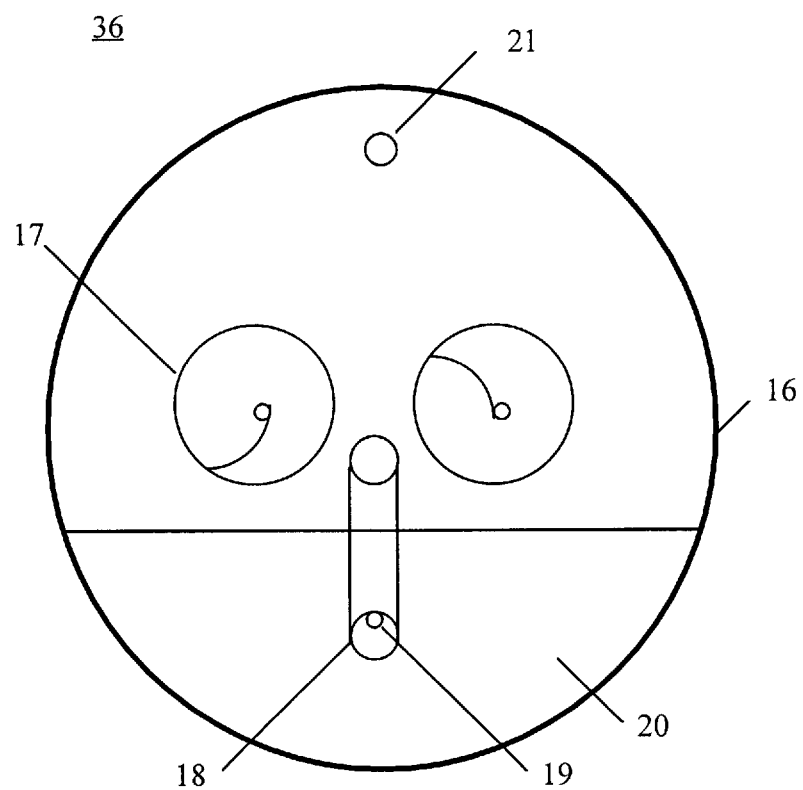
FIG. 4B is an end view of the smoke chamber shown in FIG. 4A.

Referring to FIGS. 4A and 4B, side and end views, respectively, of a smoke chamber 36 of the present invention are shown. The smoke chamber housing 16 of the smoke chamber 36 comprises a cylindrical configuration. Heating elements 17 extend from one end of the smoke chamber housing 16 to the other. In this particular embodiment, the heating elements 17 are electrically resistive wire coils. The heating elements 17 are electrically connected to a power source and an on/off switch, not shown. In this embodiment, the applicator of liquid to the heating element 17 is a blower 18. The blower 18 protrudes through one end of the smoke chamber housing 16 and angles toward a lower portion of the housing. The blower 18 comprises small blow holes 19. The blower 18 is fluidly connected to the air pump 22, shown in FIG. 3. The smoke chamber housing 16 is partially filled with a liquid 20 so that the blower 18 is submerged in the liquid 20 and the heating coils 17 are suspended directly over the liquid 20. The heating elements 17 are suspended above the liquid 20 to prevent the heating elements 17 from overheating the liquid 20 by direct contact. A smoke vent 21 protrudes from the top of the smoke chamber housing 16. The smoke vent is fluidly connected to the hydraulic hose 27, shown in FIG. 3.

Dense smoke vapor is generated by pumping air with the air pump 22 into the blower 18 and turning on the heating elements 17. As air escapes from the blower 18 through the blow holes 19, air bubbles rise to the surface of the liquid 20. As the bubbles reaches the surface of the liquid, the liquid 20 is splashed onto the hot heating elements 17 where it is burned to produce a dense smoke vapor product. The dense smoke fills the upper portion of the smoke chamber housing 16 and exits the housing by smoke vent 21. During operation, it is preferable to maintain the smoke chamber 36 in an upright position to prevent continuous contact of the heating elements 17 with the liquid and to prevent the liquid from leaking out either the blower 18 or the smoke vent 21.

In one embodiment, both the blower 18 and the smoke vent 21 comprise stop valves to close the passage ways out of the chamber 36. These are particularly useful during transportation of the smoke generator to prevent liquid 20 from leaking from the chamber 36 if it is overturned.

Figure 5:
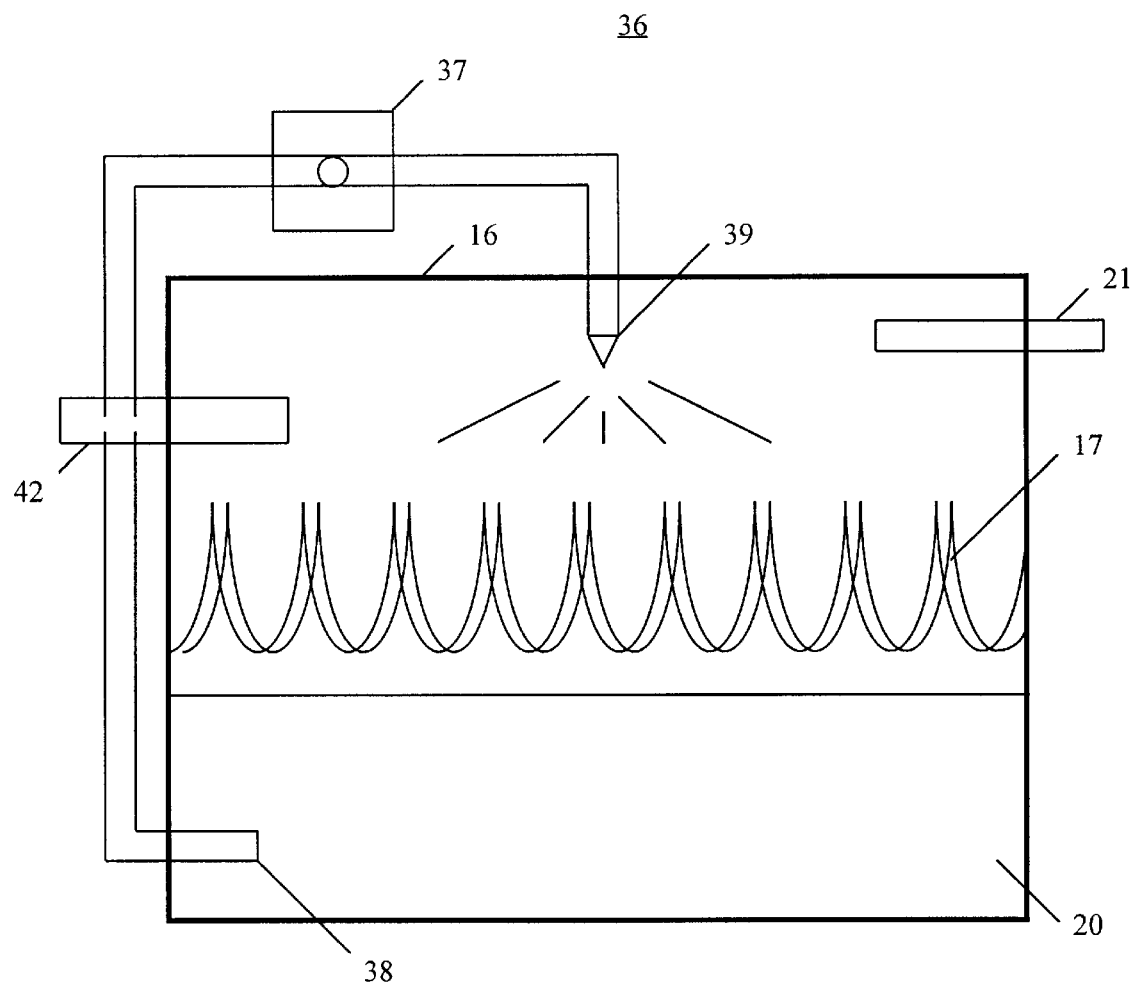
FIG. 5 is a side view of a smoke chamber of the present invention having a spray nozzle applicator.

Referring to FIG. 5, a side view of an alternative embodiment of the smoke chamber is shown. The smoke chamber 36 comprises heating elements 17, liquid 20 and a smoke vent 21, similar to the previously described embodiment. However, gas, i.e. air, is pumped by the air pump into the chamber by a conduit 42 which protrudes into an upper portion of the chamber above the liquid surface. Further, the applicator of liquid to the heating element is a liquid spray nozzle. The chamber 36 has a liquid pump 37 which draws liquid 20 into liquid intake 38 and sprays it out spray nozzle 39 to apply liquid to the heating elements 17. The intake 38 is submerged in the liquid. As shown, the spray nozzle 39 is located above the heating elements 17. Alternatively, the spray nozzle 39 is located to the side of the heating elements or even submerged in the liquid. Regardless of its location, the spray nozzle applies liquid onto the heating elements 17.

Figure 6:
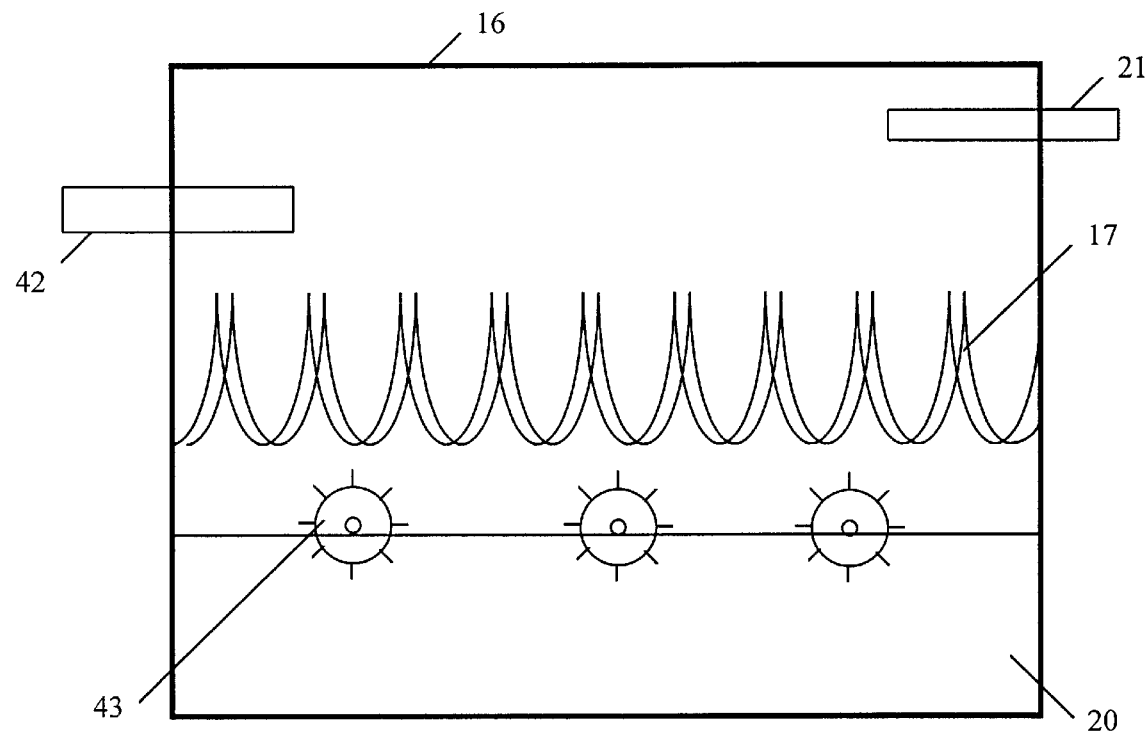
FIG. 6 is a side view of a smoke chamber of the present invention having a splatter wheel applicator.

Referring to FIG. 6, a side view of an alternative embodiment of the smoke chamber is shown. Similar to the previous embodiments, the smoke chamber 36 has a smoke chamber housing 16 with an air conduit 42 for air supply and a smoke vent 21 for smoke withdrawal. Heating elements 17 are suspended above liquid 20 which fills the bottom portion of the chamber. In this embodiment, the applicator of the liquid to the heating element is a splatter wheel. Splatter wheels 43 are partially submerged in the liquid below the heating element 17. As the splatter wheels 43 rotate, the liquid 20 is splashed upward onto the heating element 17. The splatter wheels 43 are made to rotate by any electrical, mechanical, hydraulic, etc. means known to those of skill.

Figure 7:
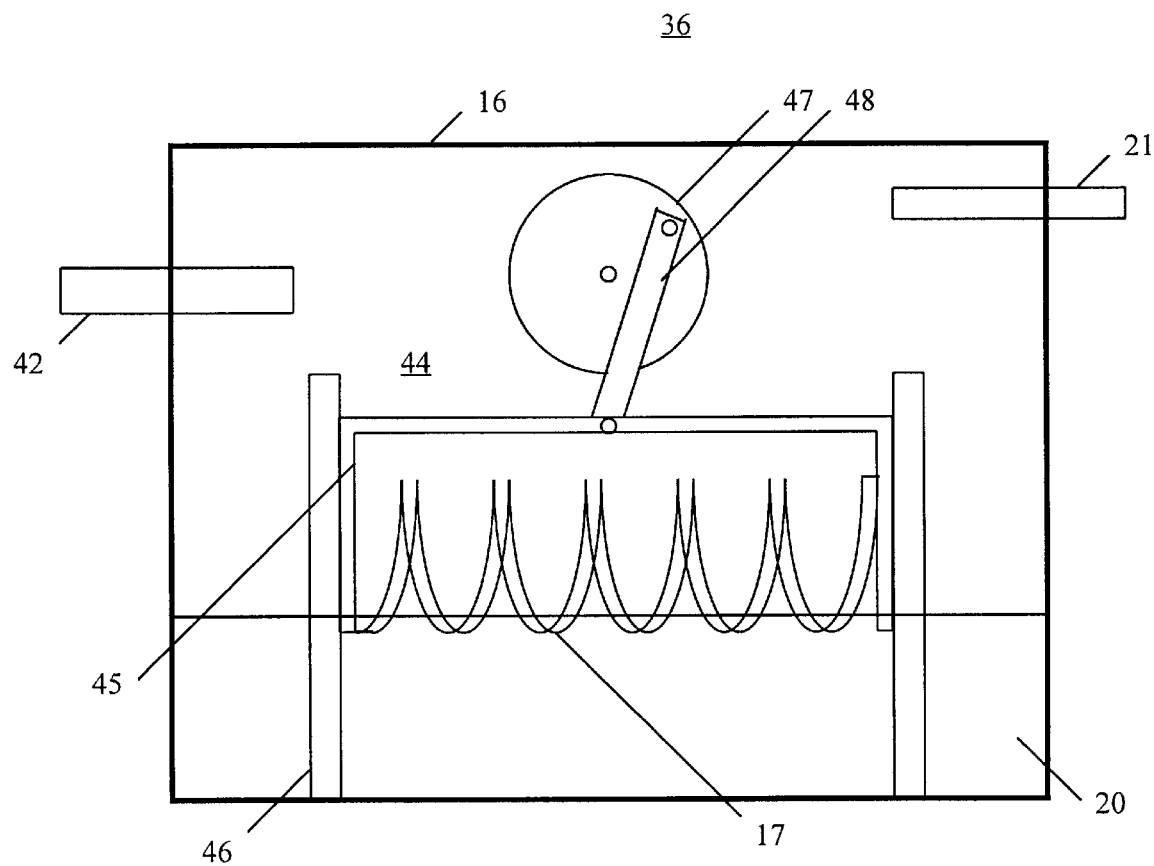
FIG. 7 is a side view of a smoke chamber of the present invention having a dipping mechanism applicator.

Referring to FIG. 7, a side view of a still further embodiment of the smoke chamber is shown. Similar to the previous embodiments, the smoke chamber 36 has a smoke chamber housing 16 with an air conduit 42 for air supply and a smoke vent 21 for smoke withdrawal. In this embodiment, the applicator of liquid to the heating element is a dipping mechanism 44. The heating element 17 is suspended by a cradle 45, over the liquid 20. The cradle 45 is held by cradle supports 46 which hold the cradle 45 in the center of the chamber an allow the cradle to slide up and down, relative to the liquid 20. The cradle 45 is also attached via linkage 48 to dipping wheel 47. As dipping wheel 47 rotates, the linkage 48 dips the cradle 45 and heating element 17 down into the liquid 20 and brings them up again. The dipping wheel 47 is made to rotate by any electrical, mechanical, hydraulic, etc. means known to those of skill. In alternative embodiments, the dipping mechanism 44 is driven by a hydraulic cylinder, and electric motor, magnets or any other known means.

While the heating elements 17 shown comprise wire coils, alternative elements comprises various configurations. For example, a square mess wire panel is also used as the heating element. With all heating elements, however, it is important to maintain sufficient spacing between windings, crosswires, etc. A suitable resistance heating wire for the heating element is found in 80% nickel, 20% chromium resistance heating wire produced by Omega Engineering, Inc. Depending on the particular liquid 20 used in the smoke generator, carbon may build upon the heating element. If the carbon build-up becomes sufficiently large to bridge the gap between adjacent windings or cross-wires of the heating element, an electrical spark may be generated across the carbon build-up. Depending on the flash point of the liquid 20, the spark could ignite the liquid having a catastrophic effect. The liquid 20 should be non-toxic and non-flammable. A suitable liquid is an oil such as Itasca 2-cycle outboard TC-W3, produced by Quaker State Corporation.

Figure 8A:
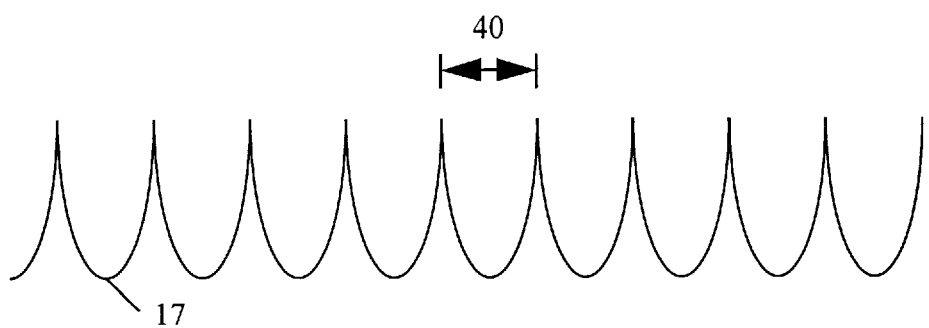
FIG. 8A is a side view of a coil heating element of the present invention.
Figure 8B:
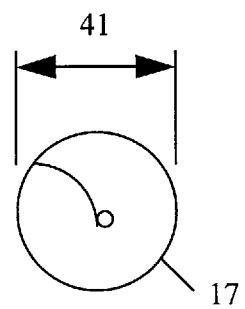
FIG. 8B is an end view of the coil heating element shown in FIG. 8A.

Referring to FIGS. 8A and 8B, side and end views of a coil heating element 17 are shown. The distance between the adjacent windings of the coils is sufficiently great to prevent carbon build-up from bridging the gap. In one embodiment, the distance between windings 40 of the coil is about ½ inch and the diameter of the windings 41 is about ⅞ inch.

Because temperature control is an issue, aluminum or any other material having high thermal conduction characteristics is used to make the smoke chamber housing 16. In alternative embodiments, heat sinks and/or heat dissipating fins are used to transfer heat from the housing 16. Generally, heat is dissipated from the smoke generator 15 by relatively cooler air which is pumped into the chamber by the air pump 22. As smoke is generated within the smoke chamber housing, this cooler air becomes the slightly heated dense smoke vapor which is removed from the chamber through the smoke vent 21. Thus, one way of controlling the temperature is by circulating air through the chamber.

Further, in an alternative embodiment, a bimetallic strip is used to control the temperature. The bimetallic strip interrupts power to the heating element when the temperature within the smoke chamber housing reaches a certain level. A thermistor or thermocouple is used with the strip to monitor the temperature. Still further, the smoke generator is also equipped with a timer switch that interrupts power to the heating element after a certain period of use. This prevents the generator from draining power and overheating unnecessarily where the technician has accidentally left the generator "on" after use. In some embodiments, the timer functions as a temperature controller in that it regulates the period of heating element operation to control the amount of heat generated by the heating element.

Figure 9A:
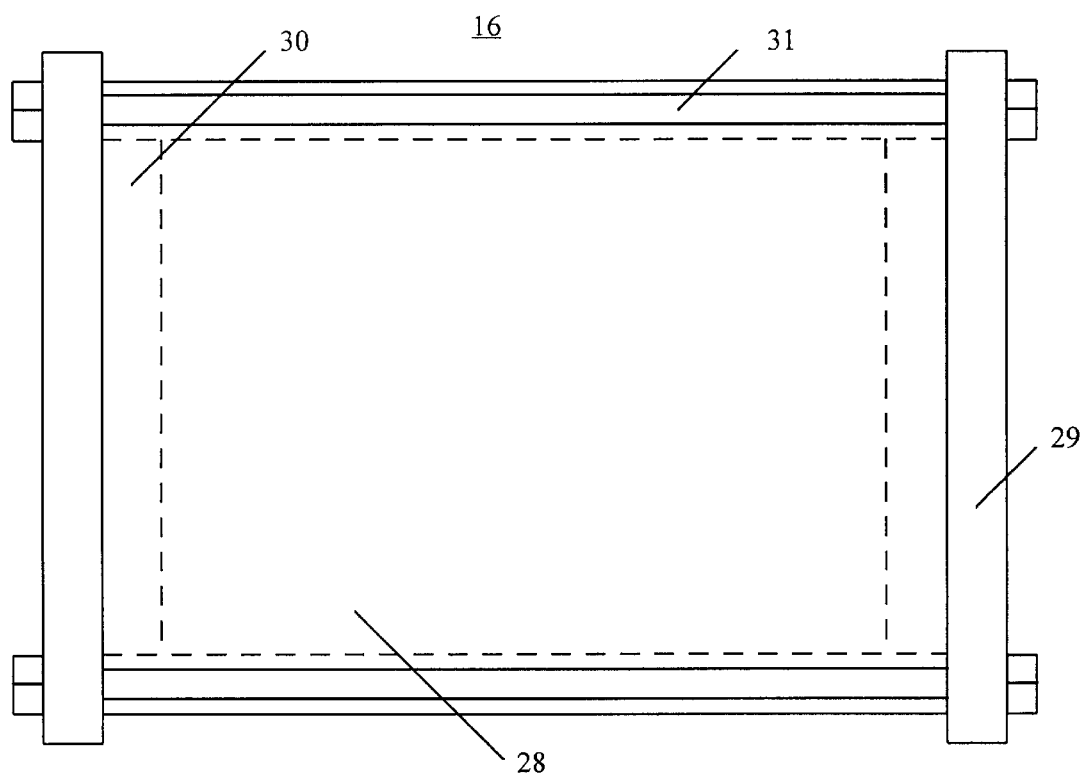
FIG. 9A is a side view of a smoke chamber housing of the present invention.
Figure 9B:
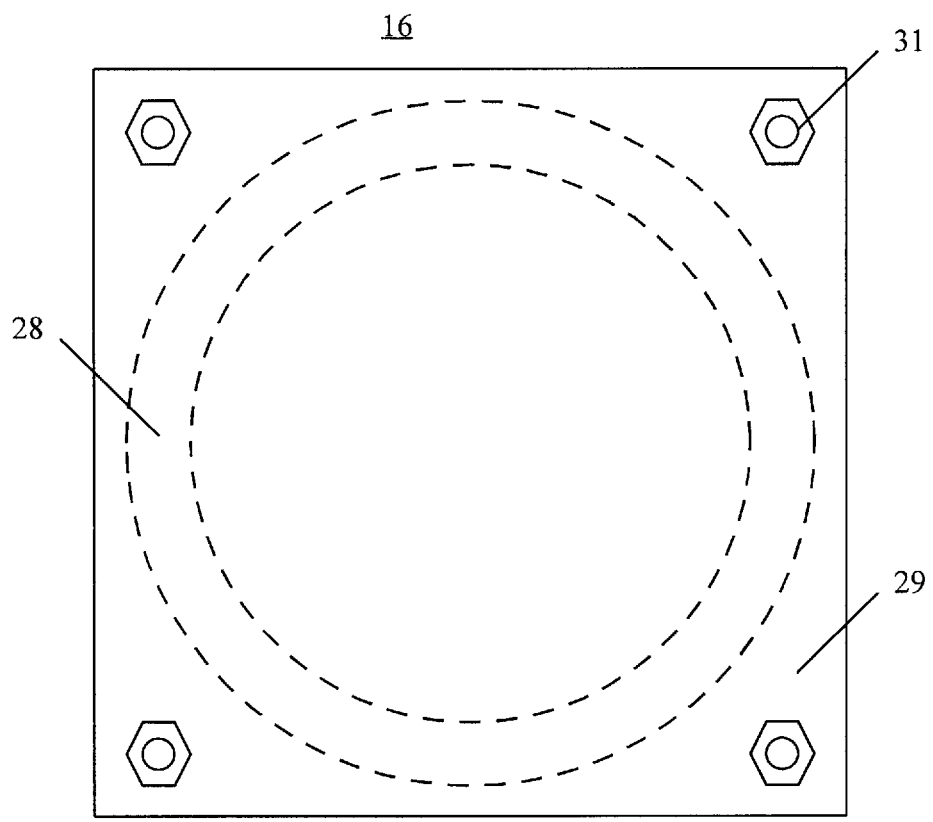
FIG. 9B is an end view of a smoke chamber housing shown in FIG. 9A.

Referring to FIGS. 9A and 9B, side and end views of an embodiment of a smoke chamber housing 16 of the present invention are shown. The housing 16 comprises a cylindrical side wall portion 28 which is open at both ends. End walls 29 are positioned at opposite ends of the side wall portion 28. The end walls 29 comprise a protrusion 30 having an outside diameter slightly less than the inside diameter of the side wall 28. The protrusions 30 are inserted into the side wall 28 to close the open ends of the side wall 28. Bolts 31 engage each of the end walls 29 to pull the end walls 29 toward each other.

Figure 10:
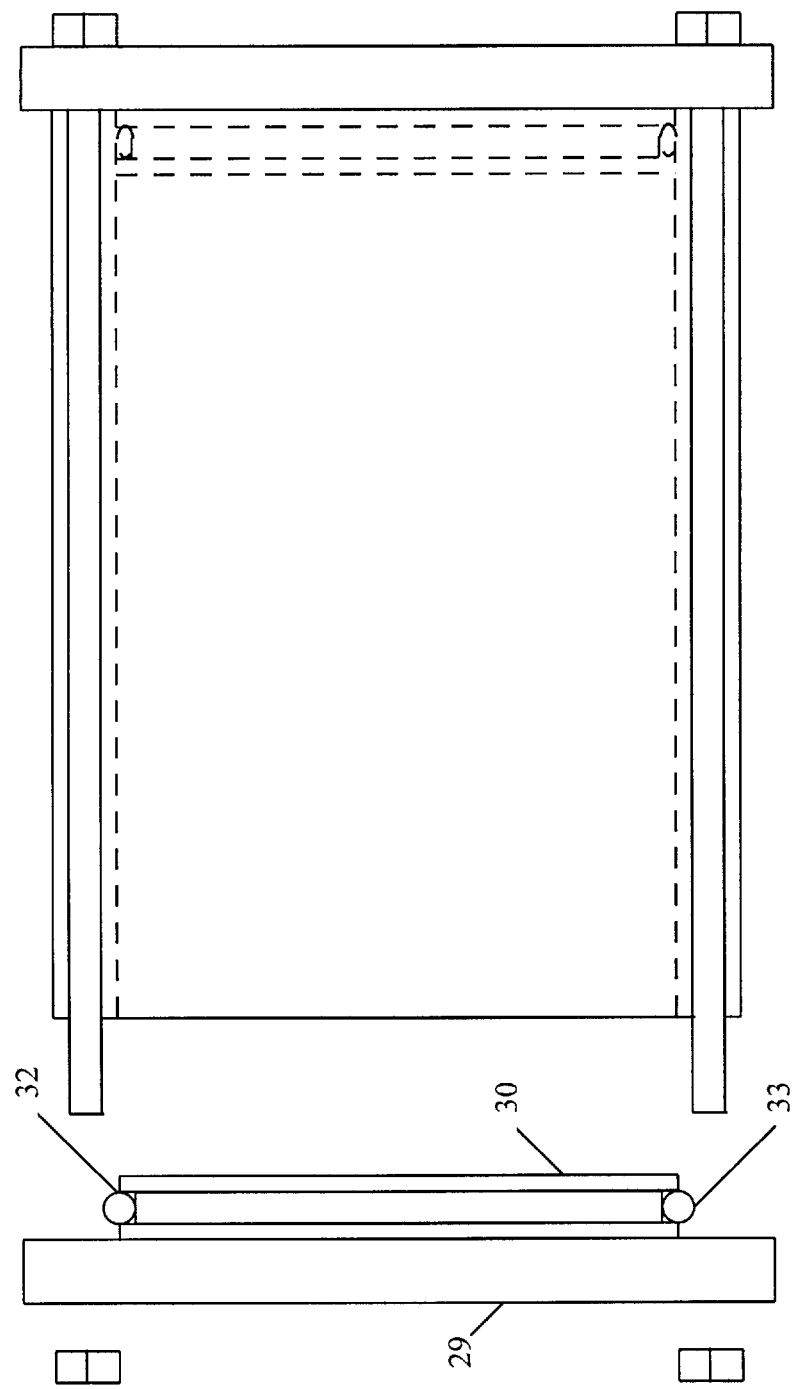
FIGS. 10 is a side view of a smoke chamber housing of the present invention.

Referring to FIG. 10, an alternative embodiment of the smoke chamber housing 16 is shown. In this embodiment, the end walls 29 comprise protrusions 30 similar to those previously described. However, the protrusions 30 comprise annular recesses 32 around the circumference of the protrusions 30. An O-ring 33 is placed in the recess 32 prior to assembly of the end walls 29 to the side wall 28. The O-ring improves the seal between the side and end walls of the smoke chamber housing 16. In further embodiments, gaskets and adhesive sealants are used to improve the seal between the side and end walls.

Figure 11:
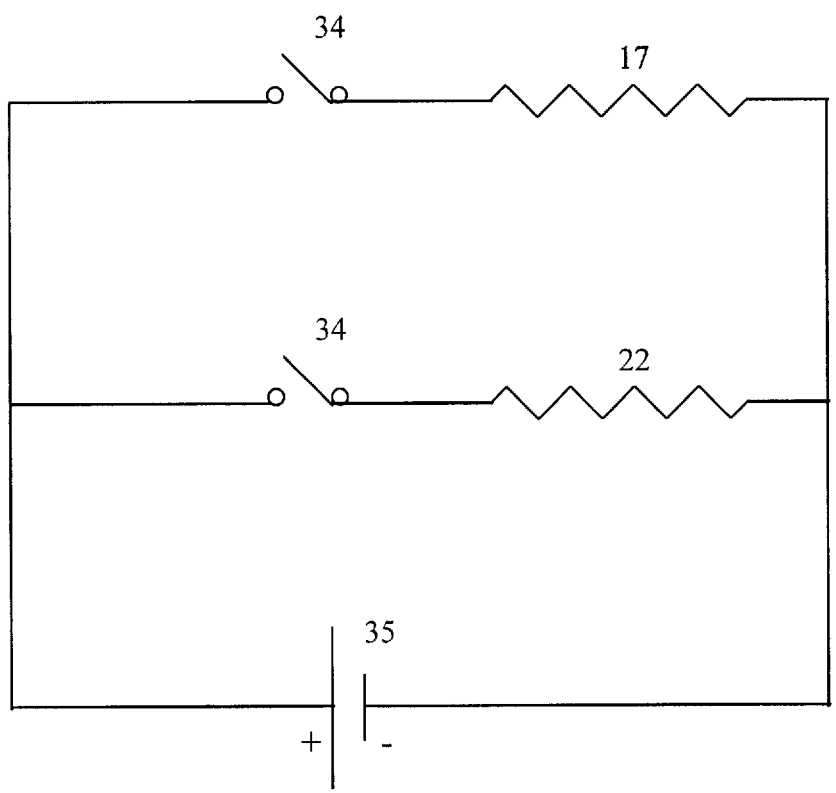
FIG. 11 is an electrical schematic of the smoke generator of the present invention.

Referring to FIG. 11, an electrical schematic diagram of the smoke generator is shown. The heating coil 17 and pump 22 are each electrically connected to an electrical source 35. Examples of the electric source 35 include: batteries, cigarette lighter adapters, wall outlet adapters. A standard 12 volt system is suitable. Electrical switches 34 are used to engage and disengage the heating element 17 and the pump 22. In a preferred embodiment, the switches 34 are remote from the heating element 17 and pump 22.

While the particular embodiments for heat exchanger testing apparatuses and methods for testing as herein shown and disclosed in detail are fully capable of obtaining the objects and advantages herein before stated, it is to be understood that they are merely illustrative of the presently preferred embodiments of the invention and that no limitations are intended by the details of construction or design herein shown other than as described in the appended claims.

The invention claimed is:

1. A smoke generator for smoke testing heat exchangers of gas furnaces so as to determine the presence or absence of leaks therein via observing any escape of a pressurized visible smoke tracer, the generator comprising:
    a smoke chamber housing having upper and lower portions;
    at least one heating element in the upper portion of said smoke chamber housing;
    a pump which supplies a pressurized carrier gas to the upper portion of said smoke chamber housing;
    a liquid which fills the lower portion of said smoke chamber housing, wherein said at least one heating element which generates a smoke vapor as a visible leak tracer is suspended above said liquid;
    an applicator of liquid to said at least one heating element; and
    a smoke vent in the upper portion of said smoke chamber housing which releases said smoke vapor and said pressurized carrier gas into said heat exchanger.

2. A smoke generator as in claim 1, wherein said smoke chamber housing comprises a cylindrical side wall and end walls.

3. A smoke generator as in claim 1, wherein said heating element comprises a wire coil which extends between and is attached to ends of the smoke chamber housing.

4. A smoke generator as in claim 1, wherein said liquid comprises oil.

5. A smoke generator as in claim 1, wherein said applicator comprises a blower with at least one blow hole, wherein said blower is submerged in said liquid and wherein said pump supplies gas to said blower, whereby gas from said blower rises in said liquid to splash liquid on said at least one heating element.

6. A smoke generator as in claim 1, wherein said applicator comprises a spray nozzle of said liquid.

7. A smoke generator as in claim 1, wherein said applicator comprises at least one splatter wheel which revolves and splashes said liquid onto said heating element.

8. A smoke generator as in claim 1, wherein said applicator comprises a dipping mechanism which is operable to descend said heating element into said liquid.

9. A smoke generator as in claim 1, further comprising a pressure gauge for monitoring the pressure of smoke vapor formed within the generator.

10. A smoke generator as in claim 1, further comprising a pressure regulator of smoke vapor within the generator.

11. A smoke generator as in claim 1, further comprising a volume flow gauge for monitoring the volume of smoke vapor escaping from the generator.

12. A smoke generator as in claim 1, further comprising a hose for fluidly communicating with a heat exchanger of a gas furnace.

13. A smoke generator for smoke testing heat exchangers of gas furnaces so as to determine the presence or absence of leaks therein, via observing any escape of a pressurized visible smoke tracer the generator comprising:
    a smoke chamber housing having upper and lower portions;
    at least one heating element which generates smoke vapor as a visible leak tracer, in the upper portion of said smoke chamber housing;
    a pump which supplies a pressurized carrier gas to the upper portion of said smoke chamber housing;
    a liquid which fills the lower portion of said smoke chamber housing, wherein said at least one heating element is suspended above said liquid;
    an applicator of liquid to said at least one heating element; and
    a smoke vent in the upper portion of said smoke chamber housing which releases said smoke vapor and said pressurized carrier gas into said heat exchanger;
    a monitor of the pressure of smoke vapor within the generator;
    a pressure regulator of the smoke vapor formed within the generator;
    a volume flow gauge for monitoring the volume of smoke vapor escaping from the generator; and a hose for fluidly communicating with a heat exchanger of a gas furnace.

14. A smoke generator as in claim 13, wherein said applicator comprises a blower with at least one blow hole, wherein said blower is submerged in said liquid and wherein said pump supplies gas to said blower, whereby gas from said blower rises in said liquid to splash liquid on said at least one heating element.

16. A smoke generator as in claim 13, wherein said applicator comprises a spray nozzle of said liquid.

16. A smoke generator as in claim 13, wherein said applicator comprises at least one splatter wheel which revolves and splashes said liquid onto said heating element.

17. A smoke generator as in claim 13, wherein said applicator comprises a dipping mechanism which operates to descend said heating element into said liquid.

18. A method of smoke testing a heat exchanger of a gas furnace so as to determine the presence or absence of leaks therein via observing any escape of a pressurized visible smoke tracer, the method comprising:

closing an intake and an outtake of the heat exchanger;

fluidly communicating a smoke generator with the heat exchanger, wherein the smoke generator comprises:
  a smoke chamber housing having upper and lower portions,
  at least one heating element which generates a smoke vapor as a visible leak tracer in the upper portion of said smoke chamber housing,
  a pump which supplies a pressurized carrier gas to the upper portion of said smoke chamber housing,
  a liquid which fills the lower portion of said smoke chamber housing, wherein said at least one heating element is suspended above said liquid,
  an applicator of liquid to said at least one heating element, and
  a smoke vent in the upper portion of said smoke chamber housing which releases said smoke vapor and said pressurized carrier gas into said heat exchanger;

filling the heat exchanger with smoke from the smoke generator; and observing smoke exiting the heat exchanger.

19. A method as in claim 18, wherein said applicator of the smoke generator comprises a blower with at least one blow hole, wherein said blower is submerged in said liquid and wherein said pump supplies gas to said blower, whereby gas from said blower rises in said liquid to splash liquid on said at least one heating element.

* * * * *